Figure 1:
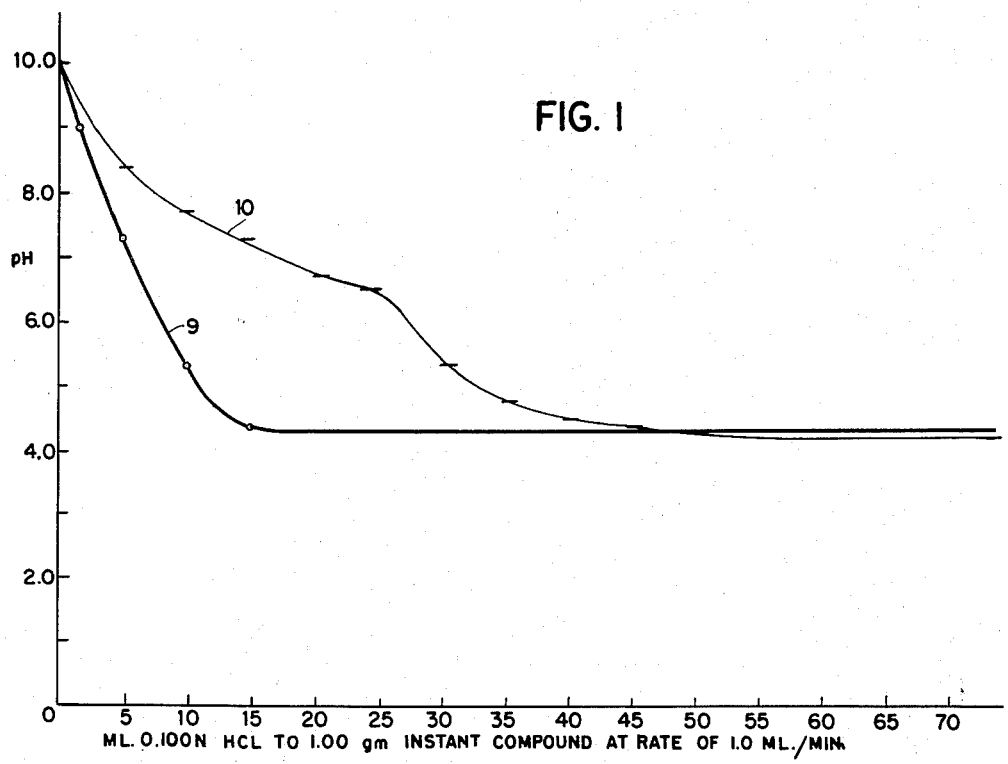

Dec. 24, 1963         S. Z. LEWIN         3,115,387
MOLECULARLY DEHYDRATED ALUMINUM HYDROXIDE DERIVATIVES
Filed Feb. 6, 1958

INFRA-RED SPECTRA OF HYDROXY-ALUMINUM
SODIUM CARBONATES
(LEWIN)

INVENTOR.
Seymour Z. Lewin
BY
H. Lee Helms
ATTORNEY

United States Patent Office 3,115,387
Patented Dec. 24, 1963

3,115,387
MOLECULARLY DEHYDRATED ALUMINUM
HYDROXIDE DERIVATIVES
Seymour Z. Lewin, New York, N.Y., assignor, by mesne assignments, to Warner-Lambert Pharmaceutical Company, Wilmington, Del., a corporation of Delaware
Filed Feb. 6, 1958, Ser. No. 713,685
8 Claims. (Cl. 23—14)

This invention relates to molecularly dehydrated aluminum hydroxide derivatives, and in particular is directed to a sodium carbonate salt thereof having the empirical composition $Al_2O_3.H_2O.NaHCO_3$. when dried to constant weight is 120° C., and $Al_2O_3.2H_2O.NaHCO_3$ when spray-dried or air dried at room temperature, having great value as a commercial antacid, and combining in unusual degree the following attributes:

It reacts rapidly with hydrochloric acid, neutralizing the acid somewhat less than completely, so that the final pH of a stoichiometric mixture is below 6, but above 3. It possesses a large acid-consuming power, so that a small amount of the antacid preparation can provide substantial relief of hyperacidity. The product is chemically well-defined and stable, so that it can be prepared in large quantities, and it may be stored and handled without decomposing, or undergoing other significant chemical change. It can be produced from inexpensive, readily available chemicals, and by an economically feasible procedure. Finally, it will not produce undersirable side reactions in the human body after performing its primary function of acid-neutralization.

Gelatinous aluminum hydroxide, and dried aluminum hydroxide gel having been widely used as commercial antacids. They have the disadvantages of being relatively slow-acting, have a relatively small acid-consuming capacity, and progressively lose their antacid capacity upon storage or drying.

It has been proposed to use as an antacid a sodium carbonate salt of aluminum hydroxide, that product being one in which a hydrogen atom of one of the three hydroxyl groups is substituted by the radical: —COONa. Although the said product, "DASC" (described in Grote Patent 2,783,179) is an improvement, as an antacid, over aluminum oxide or hydroxide gels, or calcium carbonate or sodium bicarbonate, and has been considered by many to have the optimum in antacid properties, that can be produced by the reaction between aluminum hydroxide gel and sodium bicarbonate, its rate of reaction with hydrochloric acid, in stoichiometric proportions, is to elevate the pH only up to about 3.30 in an elapsed time of about five minutes, and maintaining a pH of about 3.30 for a balance of about thirty minutes.

I have discovered that the aluminum compound of the instant invention, having the empirical composition above stated, and the structural formula hereinafter shown, effectuates a much more rapid reaction rate, raising the pH from below 2 to above 4 in less than 30 seconds, and it buffers at a pH between 4 and 5.

This discovery is surprising, in view of the fact that the compound more closely resembles the parent aluminum hydroxide in empirical composition than does the compound of the afore-said Grote Patent No. 2,783,170. Furthermore, in view of the fact that the —COONa moiety in the instant compound in proportion to the aluminum atoms is 1:2, as contrasted with the proportions thereof in the compound of said patent, which is 1:1, it would have been expected that the instant compound would be slower acting.

Examples of preparation of the compound are as follows:

(1) Dissolve one mole of $AlCl_3$ in one liter of water, add two drops of methyl orange indicator solution, and then add with rapid stirring enough 1 M NaOH to just change the color of the indicator to its basic form. Add one liter of 0.5 M $NaHCO_3$, then spray-dry. Wash the dried product to remove the NaCl, and spray-dry again. The yield is 95 to 100% of a compound in powder form having the empirical composition $Al_2O_3.2H_2O.NaHCO_3$. This method is conducted at normal room temperature. If this product is heated at 120° C. for several hours, one mole of water of hydration is lost, and the empirical composition is $Al_2O_3.H_2O.NaHCO_3$.

(2) One mole of commercial aluminum hydroxide dried gel is slurried with 1 liter of water, and 250 ml. of 2 M $NaHCO_3$ is added. The mixture is heated for 18 hours at 80° C. with vigorous stirring. The mixture is then evaporated to dryness, filtered, washed, and dried. The yield is 80 to 95% of the compound described in Example 1 above.

(3) One mole of $AlCl_3$ is dissolved in one liter of water, and the pH is adjusted to about 7 by the addition of 1 ml. of NaOH while stirring vigorously. One mole of dihydroxyaluminum sodium carbonate (analytical percentage of Na about 16%, and $Al_2O_3$ about 36%) is added and the slurry is thoroughly mixed. It is then evaporated to dryness or spray-dried, followed by washing and redrying. The yield is 95 to 100% of the compound described in Example 1.

The structural formula of my compound is:

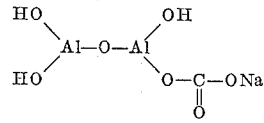

The compound can be prepared from any non-toxic aluminum salt or hydrous alumina, by neutralizing with alkali, treating with a solution of sodium bicarbonate, or its equivalent, and evaporating to dryness, in accordance with the foregoing examples. The compound contains only hydrous alumina, carbonate, sodium, and water. It is characterized by its distinctive physical properties, its infrared spectra and differential thermograms, and chemical analysis, such as the alumina, $CO_2$ and $Na_2O$ content. The compound is indefinitely stable under ordinary conditions of temperature, pressure and humidity.

*Rate of reaction with acid.*—A 30-mg. sample, adjusted to equivalency with the compound-water ratio of Grote by equilibration with air of suitable humidity content (Patent 2,783,179, Example 1), added to 20 ml. of 0.01 N hydrochloric acid raises the pH from below 2 to above 4 in about 30 seconds, and the solution buffers at a pH between 4 and 5. Under the same conditions, the dihydroxy aluminum sodium carbonate product of Grote is stated therein to raise the pH to only 3.30 in 5 minutes.

*Acid consuming power.*—A 1 gm. sample of the instant compound, on a dry basis, neutralizes 204 cc. of 0.1 N hydrochloric acid per gm.

Analysis of the dried compound:

|  | Calculated, percent | Found, percent |
|---|---|---|
| $Al_2O_3$ | 50.0 | 51.1 |
| $CO_2$ | 21.6 | 20.4 |
| $H_2$ | .74 | 0.8 |
| Na | 11.28 | 10.1 |
| Residue on ignition | 65.2 | 67.2 |
| Molecular weight | 204.0 | |

*Titration curve.*—As further showing the surprising novelty and utility of the instant compound, its titration curve comparative with that of Grote, and shown in the manner employed by Grote in Patent 2,783,179 (and 2,783,124), appears in FIG. 1 of the accompanying drawing. In the test, the procedures and conditions, including adjustment to equivalency with the compound-water ratio of Grote, were the same as specified in column 4 of the first stated patent for its curve 10. Curve 9 of the accompanying drawing is the result of the points plotted in the test of my compound, and curve 10 therein is that of Grote.

Referring to the drawing, it will be seen that the acid consuming power of my compound is greatly superior to the dihydroxy aluminum sodium carbonate composition of Grote. The buffer point of approximately pH 4.2 is reached with remarkable rapidity, and at a point where, under the same conditions, the Grote curve point is above pH 7. Buffering is not reached by Grote until six additional points of curve 10.

Figure 2:
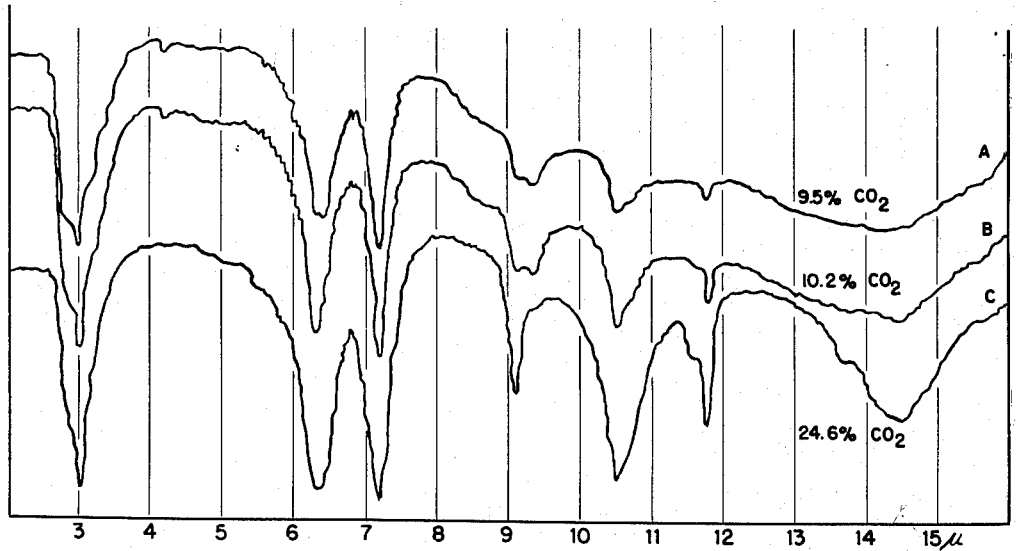

In FIG. 2 of the drawing, infra-red spectra are shown of my compounds employing lower molecular ratios of sodium bicarbonate.

The infra-red curves show characteristic bands which are produced by vibrations of specific groupings in the crystal structure of the substance investigated. The band in the vicinity of three microns is due to the OH grouping, and its exact location and shape are characteristic of the environment in which the OH groups find themselves in the crystal structure. In the compounds of the instant invention, this OH band is characteristically sharp and intense as distinguished from the OH band observed for aluminum hydroxide which is broad and relatively weak. The OH band of the instant invention comes at approximately 3.05 microns, whereas the aluminum hydroxide band is at about 2.95 microns. The bands in the vicinity of 6.3, 9.1 and 11.8 microns are characteristic of the carbonate grouping. The exact location of these bands with respect to wave length and the shape and intensities are dependent upon the environment of the carbonate grouping. As the aluminum content of the instant invention increases relative to the carbonate content, these bands are observed to diminish in intensity and to become broader and less well defined. Increase in the aluminum content is further accompanied by the appearance of new bands at 6.1 and 9.4 microns.

In the use of the compound as an antacid it may, as to one form, be tabletized into tablets of suitable compound content, for example 4–5 grains, and with or in the absence of one or more sweetening agents, flavoring materials, etc., and the dosage may be one to two tablets at a time.

In the above specification, and in the claims, where comparison is made with Grote as to rate of reaction and titration curve, the reference to equivalency of compound proportions, as to water, means that the same water content is present in the instant compound or that less water in the compound is adjusted by equivalent reduction of the compound proportion employed.

The well known compound DASC, in which the ratio of $Al.CO_2$ is 1:1, heretofore have been considered as a basic carbonate of aluminum and sodium having optimum antacid properties. Contrary to the Grote patents, which teach and explicitly require the 1:1 ratio, a new compound greatly raising the heretofore believed optimum has been created by the instant invention in which the desirable ratio is approximately 2:1.

The chemical distinctiveness of the instant preparation, viz., the evidence that it is a unique species and not simply a physical mixture of aluminum hydroxide and DASC or $NaHCO_3$, stems from the fact that its properties are not derivable from the properties of the last-mentioned three substances. The properties concerned are: rate of reaction with acid; acid-consuming power; retention of antacid capacity upon drying temperature coefficient of reactivity, the significance of which temperature coefficient is that whereas aluminum hydroxide gel loses its antacid capacity almost entirely when the temperature is reduced to 5° C. and DASC does not, the compounds of the instant invention do not show an intermediate behavior, but instead retain nearly all of their antacid characteristics unchanged at such reduced temperature.

Referring to FIG. 2 of the drawing, and the above description of the characteristic bands as shown by infra-red-curves A, B and C, the reacted materials subject of the test were as follows: The compound which produced infra-red spectra A resulted from reaction of 4.7 mol. of aluminum salt and 1 mol. of sodium bicarbonate. Item B was the compound produced by reaction between aluminum salt 4.3 mol. to 1 mol. sodium bicarbonate. Item C was the compound produced by reaction between aluminum salt 1.6 mol. to 1 mol. sodium bicarbonate. The moisture in compound A was approximately 11%, in compound B about 10%, and in compound C about 8%.

Having described my invention, what I claim and desire to secure by Letters Patent, is as follows:

1. A basic carbonate of aluminum and an alkali metal, having the empirical formula $Al_2O_3.H_2O.NaHCO_3$ structural formula:

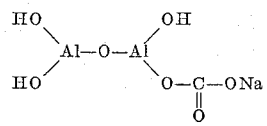

2. A basic compound having the empirical formula $Al_2O_3.H_2O.NaHCO_3$, and having a neutralizing capacity toward acid such that when 30 mg. of the compound as described are added to 20 ml. of 0.01 N-hydrochloric acid the pH value is raised from below 2 to above 4 in approximately 30 seconds, and shortly thereafter the solution buffers at a pH between 4 and 5.

3. A basic carbonate of aluminum and an alkali metal, having the empirical formula $Al_2O_3.H_2O.NaHCO_3$, when possessing the equivalent of a water content of 8 to 12% substantially the titration curve 9 illustrated in the drawing.

4. A process for the production of a compound having the empirical formula $Al_2O_3.H_2O.NaHCO_3$ which comprises the step of dissolving one mole of $AlCl_3$ in water and adjusting the pH to about 7 while stirring the solution, the step of adding to the solution one mole of dihydroxyaluminum sodium carbonate, forming a slurry, thorough stirring, and the steps of drying, washing and redrying to recover the final product.

5. A process for the production of a compound having the empirical formula $Al_2O_3.H_2O.NaHCO_3$, comprising the step of forming a slurry in water of one mole of commercial aluminum hydroxide gel, adding to the slurry about 250 ml. of 2 M $NaHCO_3$, heating the mixture for about 18 hours at about 80° C. with stirring, drying the mixture and washing and redrying to recover the final product.

6. A process for the production of a compound having the empirical formula $Al_2O_3.H_2O.NaHCO_3$ with claim 4, in which the step of adjusting the pH to about 7 is effected by the addition of 1 mole NaOH.

7. A basic compound having the empirical formula $Al_2O_3 \cdot 2H_2O \cdot NaHCO_3$, and having a neutralizing capacity toward acid such that when 30 mg. of the compound as described are added to 20 ml. of 0.01 N-hydrochloric acid the pH value is raised from below 2 to above 4 in approximately 30 seconds, and shortly thereafter the solution buffers at a pH between 4 and 5.

8. A basic compound having the following analysis:

| | | |
|---|---|---|
| $Al_2O_3$ | percent | 50.0– 51.1 |
| $CO_2$ | do | 20.4– 21.6 |
| $H_2$ | do | .74– 0.8 |
| Na | do | 10.1–11.28 |
| Residue on ignition | do | 65.2– 67.2 |
| Molecular weight | | 204.0 |

References Cited in the file of this patent

UNITED STATES PATENTS

| | | |
|---|---|---|
| 2,783,124 | Grote | Feb. 26, 1957 |
| 2,783,127 | Grote | Feb. 26, 1957 |

OTHER REFERENCES

Contribution à l'etude des gels d'alumine, par Edouard Calvet et Honoré Thibon. Pub. in Bull. Soc. Chim., France, June 20, 1953, pages 696–702.